US007684932B2

(12) United States Patent
Hidalgo et al.

(10) Patent No.: US 7,684,932 B2
(45) Date of Patent: Mar. 23, 2010

(54) SYSTEMS AND METHODS FOR DYNAMICALLY ADJUSTING SAMPLING RATES OF MASS SPECTROMETERS

(75) Inventors: August Jon Hidalgo, San Francisco, CA (US); John Christian Fjeldsted, Redwood City, CA (US); William Daniel Frazer, Mountain View, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 11/499,459

(22) Filed: Aug. 4, 2006

(65) Prior Publication Data

US 2008/0040050 A1 Feb. 14, 2008

(51) Int. Cl.
*G01N 31/00* (2006.01)

(52) U.S. Cl. .......... 702/23

(58) Field of Classification Search .......... 702/23, 702/28, 29, 137, 142, 173; 250/282, 283, 250/286–288

See application file for complete search history.

(56) References Cited

U.S. PATENT DOCUMENTS 6,362,764 B1 3/2002 Niimi et al.
6,433,713 B1 8/2002 Fuhrman
6,653,626 B2 11/2003 Fischer et al.
6,680,476 B1 1/2004 Hidalgo et al.
6,744,044 B2 6/2004 Hidalgo et al.
6,778,125 B1 8/2004 Stewart et al.
6,822,227 B1 * 11/2004 Hidalgo et al. .......... 250/287
6,878,931 B1 4/2005 Roushall et al.
2003/0173514 A1 9/2003 Syage et al.
2003/0218129 A1 11/2003 Rather
2004/0079877 A1 * 4/2004 Hidalgo et al. .......... 250/287
2005/0265499 A1 * 12/2005 Zhang .......... 375/354
2007/0255532 A1 * 11/2007 Fjeldsted et al. .......... 702/189
2008/0029697 A1 * 2/2008 Willis et al. .......... 250/287

FOREIGN PATENT DOCUMENTS

GB 2 129 238 * 5/1984
GB 2 342 205 * 4/2000
GB 2 444 348 * 6/2008
JP 54063890 10/1977
JP 2001351570 6/2000

OTHER PUBLICATIONS

Multirate FAQ: Decimation, lowegian International Corp., 2000-2004.*
GB Application No. 0715153.3 Search Report dated Mar. 29, 2008.

* cited by examiner

*Primary Examiner*—Michael P Nghiem

(57) ABSTRACT

A mass spectrometer includes an ion detector, an analog-to-digital (A/D) converter, and a decimator. The analog-to-digital (A/D) converter is configured to receive and sample an analog signal from the ion detector thereby providing a first plurality of samples at a first rate. The decimator is configured to receive the first plurality of samples and to transmit, at a second rate, a second plurality of samples that are based on the first plurality of samples. The decimator is further configured to dynamically adjust the second rate so that memory requirements for the mass spectrometer are reduced.

13 Claims, 5 Drawing Sheets

29

| | |
|---|---|
| n - 4 | $sample_{n-3}$ |
| n - 3 | $sample_{n-2}$ |
| n - 2 | $sample_{n-1}$ |
| n - 1 | $sample_{n}$ |
| n | $sample_{n+1}$ |

FIG. 2
(Prior Art)

29

| | |
|---|---|
| n - 4 | $sample_{n-3}$ |
| n - 3 | $(sample_{n-2} + sample_{n-1})/2$ |
| n - 3 | $(sample_{n} + sample_{n+1})/2$ |

FIG. 7

SYSTEMS AND METHODS FOR DYNAMICALLY ADJUSTING SAMPLING RATES OF MASS SPECTROMETERS

RELATED ART

In time-of-flight mass spectrometers (TOFMS), a mass specimen to be analyzed is ionized, accelerated in a vacuum through a known potential, and then the arrival time of the different ionized components is measured at a detector. The larger the particle, the longer the flight time; the relationship between the flight time and the mass, m, can be written in the form:

$$\text{time}=k\sqrt{m}+c$$

where k is a constant related to flight path and ion energy, c is a small delay time, which may be introduced by the signal cable and/or detection electronics. When the term "mass" is used herein in the context of mass spectrometry of ions, it usually is understood to mean "mass-to-charge ratio."

An ion detector converts ion impacts into electrons. The signal generated by the detector at any given time is proportional to the number of electrons. There is only a statistical correlation between one ion hitting the detector and the number of electrons generated. In addition, more than one ion at a time may hit the detector due to ion abundance.

The mass spectrum generated by the spectrometer is the summed output of the detector as a function of the time-of-flight between the ion source and the detector. The number of electrons leaving the detector in a given time interval is converted to a voltage that is digitized by an analog-to-digital converter (A/D).

A mass spectrum is a graph of the output of the detector as a function of the time taken by the ions to reach the detector. In general, a short pulse of ions from an ion source is accelerated through a known voltage. Upon leaving the accelerator, the ions are bunched together but travelling at different speeds. The time required for each ion to reach the detector depends on its speed, which in turn, depends on its mass. Consequently, the original bunch is separated in space into discrete packets, each packet containing ions of a single mass, that reach the detector at different times.

A mass spectrum is generated by measuring the output of the A/D converter as a function of the time after the ions have been accelerated. The range of delay times is divided into discrete "bins." Unfortunately, the statistical accuracy obtained from the ions that are available in a single packet is insufficient. In addition, there are a number of sources of noise in the system that result in detector output even in the absence of an ion striking the detector. Hence, the measurement is repeated a number of times ("multiple scans") and the individual mass spectra are summed to provide a final result having the desired statistical accuracy and signal-to-noise ratio.

The amount of data required to accurately define the mass spectra measured by the mass spectrometer can be significant requiring a large amount of memory, which can be expensive and prohibitively complicated. Moreover, reducing the memory requirements of a mass spectrometer is generally desirable so that the cost and complexity of the mass spectrometer can be reduced.

SUMMARY OF THE DISCLOSURE

Generally, embodiments of the present disclosure provide mass spectrometers and methods for dynamically adjusting sampling rates for signals from ion detectors.

A mass spectrometer in accordance with one exemplary embodiment of the present disclosure comprises an ion detector, an analog-to-digital (A/D) converter, and a decimator. The analog-to-digital (A/D) converter is configured to receive and sample an analog signal from the ion detector thereby providing a first plurality of samples at a first rate. The decimator is configured to receive the first plurality of samples and to transmit, at a second rate, a second plurality of samples that are based on the first plurality of samples. The decimator is further configured to dynamically adjust the second rate so that memory requirements for the mass spectrometer are reduced.

A method in accordance with another exemplary embodiment of the present disclosure comprises: detecting ions; sampling an analog signal indicative of the detected ions thereby providing a first plurality of samples at a first rate; transmitting, at a second rate, a second plurality of samples of the analog signal to a summer, the second plurality of samples based on the first plurality of samples; storing in memory values defining a mass spectrum; summing, via the summer, the second plurality of samples with the values; and dynamically adjusting the second rate.

A method in accordance with yet another exemplary embodiment of the present disclosure comprises: detecting ions; sampling an analog signal indicative of the detected ions to provide a first plurality of samples at a first rate; sampling the analog signal to provide a second plurality of samples at a second rate that is lower than the first rate; and summing the first and second plurality of samples with values stored in memory, the values defining a mass spectrum.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 2 is a block diagram illustrating a portion of memory depicted in FIG. 1.

FIG. 7 is a block diagram illustrating a portion of the memory depicted in FIG. 3 for an exemplary embodiment of the present disclosure.

DETAILED DESCRIPTION

The present disclosure generally relates to mass spectrometers and methods for dynamically adjusting an effective sampling rate of a signal from an ion detector so that memory requirements can be reduced. A time-of-flight mass spectrometer in accordance with one exemplary embodiment of the present disclosure, for each mass scan, ionizes a mass specimen, and an ion detector provides an analog signal indicative of detected ion abundance as a function of time.

The analog signal is sampled, and digitized samples from different mass scans are summed to define a resultant mass spectrum. The number of mass scans is selected to provide a desired statistical accuracy for the resultant mass spectrum.

During each mass scan, the effective sampling rate of the analog signal is changed. In one embodiment, the analog signal is effectively sampled at a relatively high rate at the beginning of the mass scan as compared to later in the mass scan. Thus, as the mass scan progresses, the number of digitized samples provided for summing per unit of time decreases thereby reducing the number of memory locations required to store the resultant mass spectrum as compared to an embodiment in which the analog signal is effectively sampled at the same high rate throughout the entire mass scan.

Figure 1:
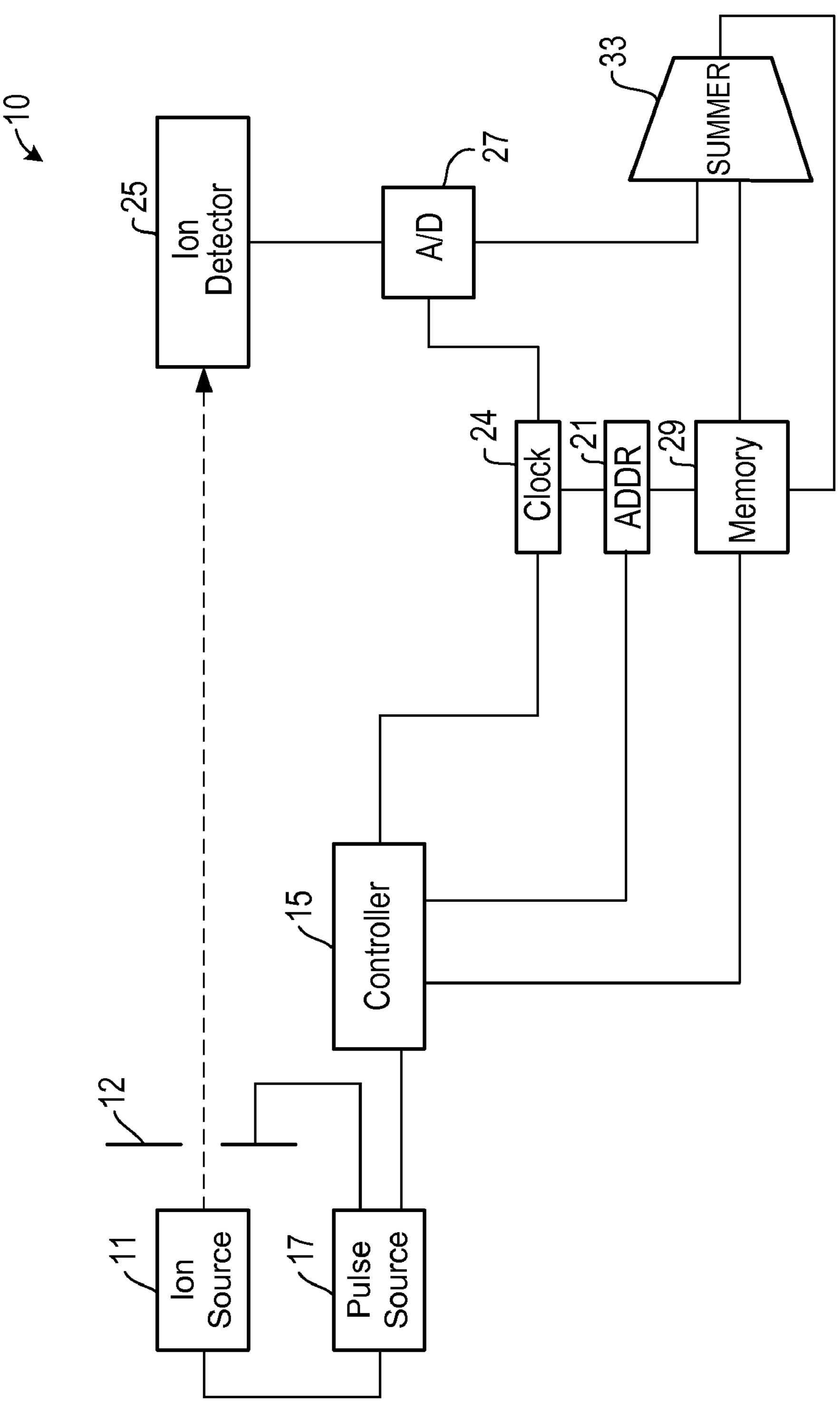
FIG. 1 (Prior Art)
FIG. 1 is a block diagram illustrating a conventional mass spectrometer.

FIG. 1 illustrates a conventional time-of-flight mass spectrometer 10. A mass specimen to be analyzed is introduced into an ion source 11 that ionizes the specimen. The ions so produced are accelerated by applying a potential between the ion source 11 and an electrode 12. The measurement of the mass specimen is composed of multiple mass scans. At the beginning of each mass scan, a controller 15 causes a short pulse to be applied between the electrode 12 and ion source 11 by sending the appropriate control signal to a pulse source 17. The controller 15 also resets the contents of a write address register 21. On subsequent clock cycles, the address register 21 is incremented by a signal from a clock 24, and an analog signal generated by an ion detector 25 is digitized by an analog-to-digital converter (A/D) 27. The value stored in memory 29 at the address specified in the address register 21 is applied to an adder 33, which adds the stored value to the value provided by A/D converter 27. The summed value is then stored back in memory 29 at the address in question.

As noted above, the time required by an ion to traverse the distance between the electrode 12 and the detector 25 is a measure of the mass of the ion. This time is proportional to the value in address register 21 when the ion strikes the detector 25. Hence, memory 29 stores data that can be used to generate a graph of the number of ions with a given mass as a function of the mass. In other words, the data stored in memory 29 defines a mass spectrum of the mass specimen being analyzed.

Various devices, such as a Faraday cup, multichannel plate (MCP), electron multiplier (continuous structure as well as dynode structure), conversion dynode, Daly detector, and combinations thereof, may be used to implement the ion detector 25. The signal generated by the ion detector 25 depends on the number of ions striking the detector 25 during the clock cycle in question. In general, this number is relatively small, and hence the statistical accuracy of the measurements obtained in any single mass scan is usually insufficient. In addition, there is a significant amount of noise in the system. The noise is generated in the detector 25, analog path, and in the A/D converter 27.

To improve statistical accuracy, the data from a large number of mass scans are summed. At the beginning of the measurement process, the controller 15 stores zeros in all of the memory locations in memory 29 and initiates the first mass scan. When the first mass scan is completed, the controller 15 resets the address register 21 and initiates another mass scan by causing the pulse source 17 to pulse the electrode 12. The data from the second mass scan is added to that from the previous mass scan. This process is repeated until the desired statistical accuracy is obtained.

Thus, each memory address stores a sum of corresponding samples from different mass scans. As used herein, samples are "corresponding" if they are taken at the same time after the start of their respective mass scans. For example, a sample taken at a time, $t_1$, after the start of a first mass scan corresponds to a sample taken at the same time, $t_1$, after the start of another mass scan. The sum of corresponding samples from each of the mass scans is stored in one of the addresses in memory 29 and represents a data point of the resultant mass spectrum. Note that the start of a mass scan refers to the generation of the pulse that ionizes the mass specimen being analyzed by the mass scan.

Further, in embodiments for which the write address register 21 is incremented for each clock cycle, contiguous memory addresses store samples that are consecutive in terms of time. For example, assuming that the address register is four digits and is reset by the controller 15 at the beginning of a mass scan, as described above, the data value stored at address 0000 represents the sum of digital samples taken during the first clock cycle of each mass scan. The data value stored at address 0001 represents the sum of digital samples taken during the second clock cycle of each mass scan, and so on. Moreover, the foregoing is illustrated by FIG. 2.

In this regard, address (n) of memory 29 stores the sum ($sample_{n+1}$) of digital samples taken during the $(n+1)^{th}$ clock cycle after the start of each mass scan, where n is a positive integer less than the total number of addresses in memory 29. Address (n−1) of memory 29 stores the sum ($sample_n$) of digital samples taken during the $(n)^{th}$ clock cycle after the start of each mass scan, and address (n−2) of memory 29 stores the sum ($sample_{n-1}$) of digital samples taken during the $(n-1)^{th}$ clock cycle after the start of each mass scan. Further, address (n−3) of memory 29 stores the sum ($sample_{n-2}$) of digital samples taken during the $(n-2)^{th}$ clock cycle after the start of each mass scan, and address (n−4) of memory 29 stores the sum ($sample_{n-3}$) of digital samples taken during the $(n-3)^{th}$ clock cycle after the start of each mass scan.

Unfortunately, the amount of memory 29 required to store all of the data points of the resultant mass spectrum can be quite large thereby increasing the cost and complexity of the mass spectrometer 10. In this regard, the memory 29 has a number of addresses equal to or greater than the number of data points used to define the resultant mass spectrum. Most time-of-flight mass spectrometers sample the analog signal from the ion detector 25 at a very high rate to achieve a desired resolution and, therefore, create an extremely large number of data points.

Figure 3:
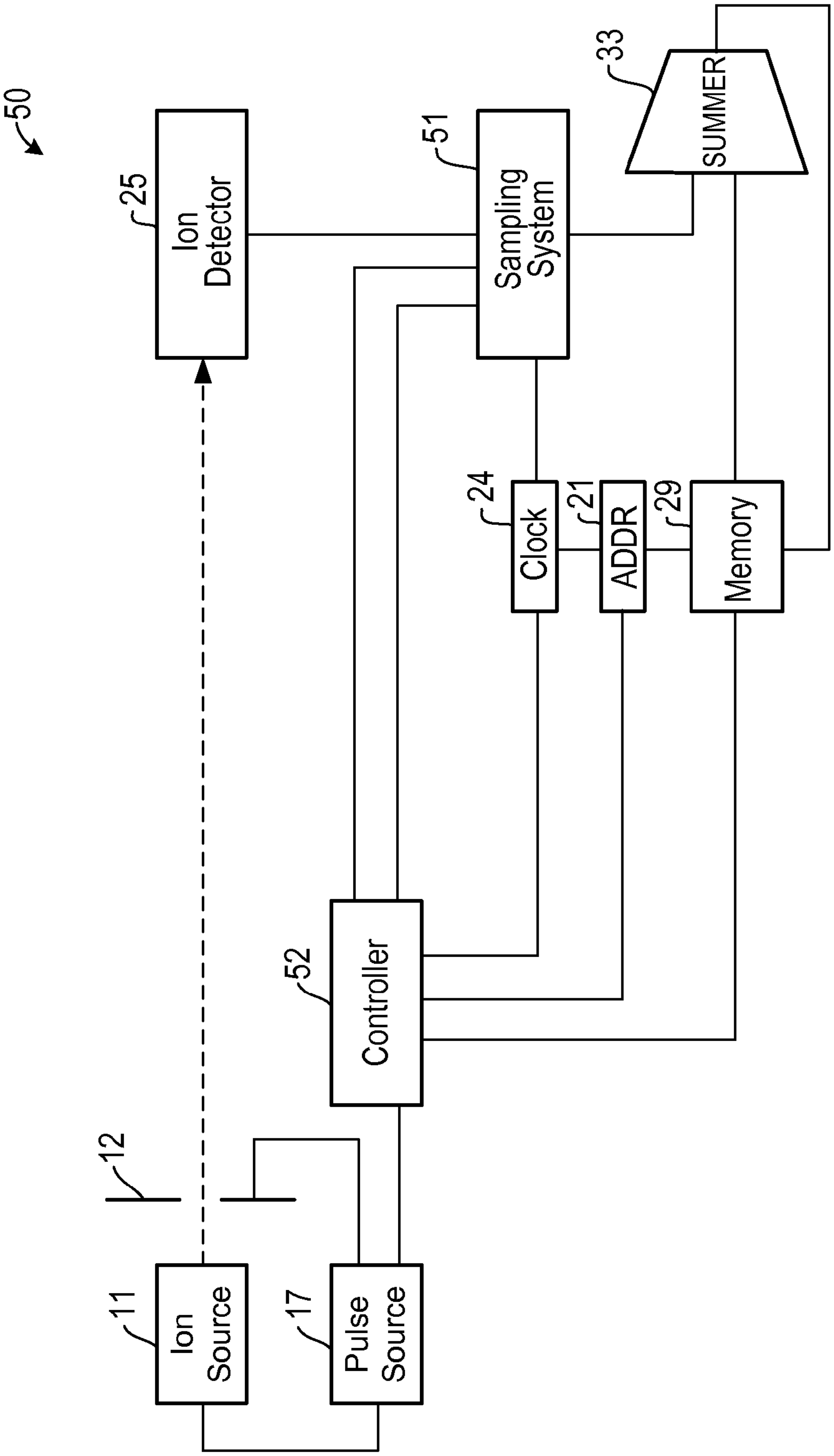
FIG. 3 is a block diagram illustrating a mass spectrometer in accordance with an exemplary embodiment of the present disclosure.

FIG. 3 depicts a time-of-flight mass spectrometer 50 in accordance with an exemplary embodiment of the present disclosure. To simplify the description of FIG. 3 and subsequent drawings, those elements that serve functions analogous to elements discussed above with reference to FIG. 1 have been given the same numeric designations.

Figure 4:
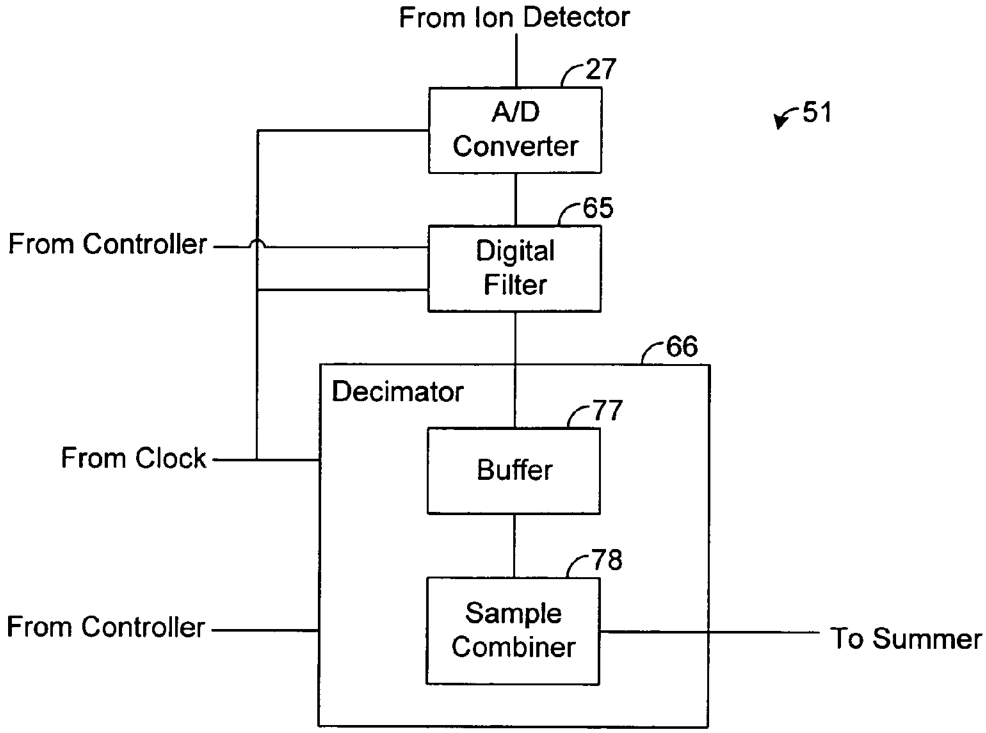
FIG. 4 is a block diagram illustrating an exemplary sampling system, such as is depicted in FIG. 3.

As shown by FIG. 3, the mass spectrometer 50 comprises an ion source 11, a pulse source 17, a write address register 21, a clock 24, an ion detector 25, memory 29, an adder 33, and a sampling system 51. As shown by FIG. 4, the sampling system 51 comprises an A/D converter 27. The elements 17, 21, 24, 25, 27, 29, and 33, operating under the direction and control of a controller 52, perform essentially the respective functions as the elements of the same reference numerals in FIG. 1. The controller 52 can be implemented in hardware, software, or a combination thereof. As an example, the controller 52 may be implemented in software and executed by a digital signal processor (DSP), a central processing unit (CPU), or other type of apparatus for executing the instructions of the controller 52. In other embodiments, the controller 52 can be implemented in firrnware or hardware, such as logic gates, for example.

As described above with reference to FIG. 1, a mass specimen to be analyzed is introduced into the ion source 11 that ionizes the specimen. A pulse from the pulse source 17 causes the ions in the ion source 11 to be accelerated toward the ion detector 25, which detects the accelerated ions. The ion detector 25 outputs an analog signal indicative of the detected ions.

As in FIG. 1, the analog signal output by the detector 25 of FIG. 3 is sampled by the A/D converter 27 of FIG. 4. Referring to FIG. 4, the digitized samples from the A/D converter 27 are processed by a digital filter 65 and a decimator 66, which will both be described in more detail below. Similar to the conventional mass spectrometer 10 of FIG. 1, digital samples from the decimator 66 of FIG. 4 are summed by a summer 33 (FIG. 3) with samples from previous mass scans, and the results of the summing are stored to memory 29.

Thus, once the spectrometer 50 of FIG. 3 takes a measurement, which preferably includes a large number of mass scans, the memory 29 is storing measurement data similar to the embodiment depicted by FIG. 1. Each address in memory 29 is storing a running sum of digitized samples and represents a data point of the resultant mass spectrum defined by the measurement data in memory 29.

In a time-of-flight mass spectrometer, heavier mass ions arrive at the ion detector after lighter mass ions. The analog signal from the ion detector 25 as a function of time exhibits peaks that can be identified as originating from ions of specific masses. A pulse in the analog signal is due to ions of a particular mass striking the ion detector 25 over a small duration of time. Ions of the same mass are generally bunched together as they travel toward and strike the ion detector 25 and will be referred to hereafter as an "ion packet." Thus, ions within the same "packet" have the same mass. Further, pulses of the analog signal from the ion detector 25 will be referred to hereafter as "analog pulses."

The ions of lighter mass ion packets tend to be bunched closer together than the ions of heavier mass ion packets. Indeed, for lighter mass ion packets, there is statistically less separation in time between multiple ion strikes from the same packet as compared to the statistic separation time for heavier mass ion packets. Moreover, the width of an analog pulse from the ion detector 25 for a lighter mass ion packet is usually smaller than the width of an analog pulse from the ion detector 25 for a heavier mass ion packet. Thus, although a high sampling rate may be desired to adequately sample the analog pulse for a lighter mass ion packet, a lower sampling rate may be adequate to sample the analog pulse for a heavier mass ion packet.

The decimator 66 of FIG. 4 uses the relationship between mass and peak width to dynamically control the effective sampling rate of the sampling system 51. As used herein, the "effective sampling rate" refers to the rate at which samples are provided by the system 51 for summing with the values in memory 29 that define the resultant mass spectrum. As is apparent from the following description, the effective sampling rate of the system 51 can be different than the actual rate at which the A/D converter 27 samples the analog signal from the ion detector 25. Further, the term "dynamically" is used herein to describe an event or action that occurs as a mass scan is progressing.

In at least one embodiment, the decimator 66 allows a higher effective sampling rate for analog pulses corresponding with lighter mass ion packets and lowers the effective sampling rate for analog pulses corresponding with heavier mass ion packets. In this regard, the lighter mass ion packets arrive at the ion detector 25 before the heavier mass ion packets and, therefore, are sampled first. Thus, for each mass scan, the decimator 66 initially outputs samples at a high rate. However, over time, heavier mass ion packets begin to arrive at the ion detector 25 and are sampled. Moreover, after a predefined amount of time has elapsed, the decimator 66 lowers its rate of outputting samples such that digitized samples for the heavier mass ion packets are output at a lower rate as compared to the samples for the previously sampled lighter mass ion packets. In other words, the decimator 66 decimates the effective sampling rate of the system 51. The decimating of the effective sampling rate reduces the number of samples to be stored in memory 29 and, therefore, reduces the required memory size of memory 29.

In order to further conserve memory space as the mass scan progresses and, therefore, the desire for higher sampling rates abates, the effective sampling rate can be decimated more than once during the same mass scan as the ions in the packets reaching the detector 25 become heavier. However, once a mass scan is complete, the effective sampling rate is set to the initial rate that is to be used for the lighter mass ion packets to be received for the next mass scan.

Figure 5:
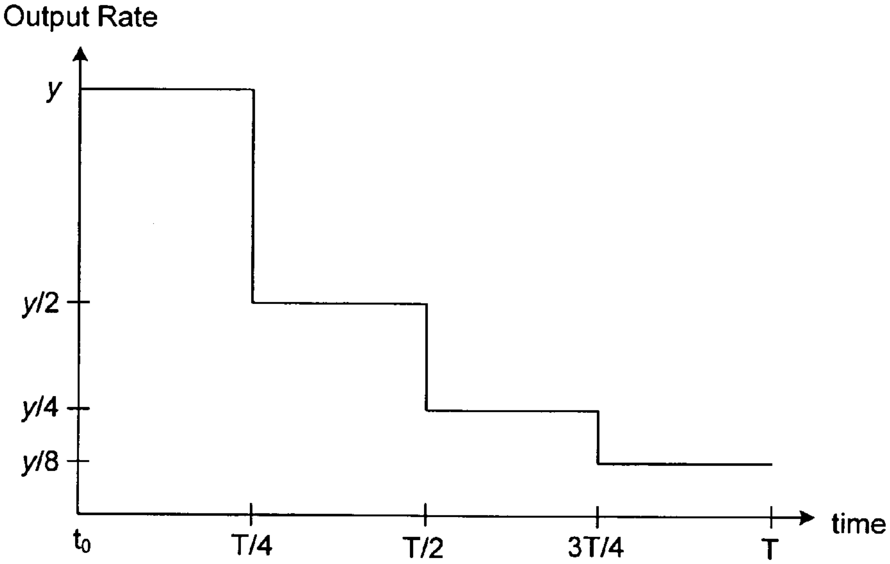
FIG. 5 is a graph illustrating an exemplary output rate for a decimator depicted in FIG. 4 versus time.

In one embodiment, which will be described in more detail hereafter for illustrative purposes, the decimator 66 of FIG. 4 reduces its output rate by a factor of two (2) each time it decimates the effective sampling rate. FIG. 5 shows an exemplary graph of the decimator's output rate versus time for such an embodiment. In this regard, assume that time, $t_0$, represents the beginning of a mass scan of a duration, T. Initially, the decimator's output rate is y. Once one-fourth of the mass scan is complete (i.e., at time T/4), the decimator's output rate is reduced by one-half to y/2. Note that the ions being sampled after time T/4 are heavier than the ions sampled for the same mass scan prior to time T/4 such that a lower output rate can be used after time T/2 . Once one-half of the mass scan is complete (i.e., at time T/2 ), the decimator's output rate is reduced by one-half to y/4. Further, the ions being sampled after time T/2 are heavier than the ions sampled for the same mass scan prior to time T/2 such that a lower output rate can be used after time T/2 . Once three-quarters of the mass scan is completed (i.e., at time 3T/2 ), the decimator's output rate is again reduced by one-half to y/8. Note that the ions being sampled after time 3T/4 are heavier than the ions sampled for the same mass scan prior to time 3T/4 such that a lower output rate can be used after time 3T/4. Once the mass scan is complete (i.e., at time T), the decimator's output rate is reset toy for the next mass scan.

In the example shown by FIG. 5, the decimator's output rate is reduced by one-half after completion of each quarter of a mass scan. However, rate adjustments other than one-half are possible, and the timing of when adjustments occur may be different in other embodiments as well. Further, it is unnecessary for the decimator's output rate to be reduced by the same amount for each rate adjustment, and any number of rate adjustments per scan are possible.

Note that it is possible for the sampling rate of the A/D converter 27 to be adjusted as is described above for the decimator's output rate. In such a case, implementation of the digital filter 65, which will be described in more detail hereafter, and the decimator 66 would be unnecessary. However, changing the sample rate of a high speed A/D converter can be problematic. Moreover, using a decimator 66 to adjust the effective sampling rate of the system 51 is generally desirable so that the sampling rate of the A/D converter 27 may remain constant.

Reducing the output rate of the decimator 66 reduces the effective sampling rate of the system 51 even though the actual sampling rate of the A/D converter 27 remains unchanged. In this regard, the number of samples used to define the resultant mass spectrum is generally equal to the number of samples output by the system 51 per mass scan, not the number of samples output by the A/D converter 27 per mass scan. Moreover, the Nyquist criterion specifies that a sampling rate must be twice the highest frequency component of the sampled signal in order to generate an accurate representation of the signal. If the sampling rate of the A/D converter 27 is close to the minimum Nyquist rate (i.e., half of the highest frequency component of the analog signal from ion detector 25), then a reduction of the decimator's output rate is likely to reduce the effective sampling rate of the system 51 below the minimum Nyquist rate for the analog signal output by the ion detector 25. Thus, the digital filter 65 preferably filters the digitized samples from the A/D converter 27 such that the Nyquist criterion is not violated due to an adjustment to the system's effective sampling rate by the decimator 66.

For example, for each adjustment of the effective sampling rate by the decimator 66, the digital filter 65 may be configured to filter the samples from the A/D converter 27 such that its bandwidth is reduced by at least the same percentage as the adjustment to the effective sampling rate. Thus, in the embodiment described above referring to FIG. 5 in which the decimator 66 reduces its output rate by one-half for each adjustment, the digital filter 65 may be configured to reduce its bandwidth by at least one-half each time the decimator 66 reduces its output rate. For example, referring to FIG. 5, at time T/2 , the digital filter 65 may reduce its bandwidth to one-half of its original bandwidth (i.e., the filter's bandwidth at time $t_0$ through T/2 ). At time T/2 , the digital filter 65 may reduce its bandwidth to one-quarter of its original bandwidth, and at time 3T/4, the digital filter 65 may reduce its bandwidth to one-eighth of its original bandwidth. At time T, the digital filter 65 may reset its bandwidth to the original bandwidth for the next mass scan. Other algorithms for controlling the bandwidth of the digital filter 65 to prevent violation of the Nyquist criterion are possible in other embodiments.

If the output rate of the digital filter 65 is higher than the output rate of the decimator 66, such as may initially be the case when the decimator 66 reduces its output rate and the sampling rate of the A/D converter 27 remains constant, then at least some of the data from the digital filter 65 may be lost. For example, assume that the output rate of the decimator 66 equals the output rate of the digital filter 65 before an adjustment to the output rate of the decimator 66. If the decimator's output rate is reduced by one-half, as described above, then the decimator 66 may be configured to output every other sample received from the digital filter 65. In such an embodiment, one-half of the filtered samples may be discarded or lost.

Alternatively, to provide a more accurate resultant mass spectrum, the decimator 66 may be configured to combine samples to reduce or eliminate the number of samples discarded. For example, if the decimator's output rate is reduced by one-half, as described above, the decimator 66 may be configured to take an average of every two consecutive samples from the A/D converter 27 and to output each of the calculated averages as the digitized samples to be summed by summer 33. An exemplary embodiment implementing such an approach will be described in more detail below with reference to FIGS. 4 and 6.

In this regard, FIG. 4 shows a detailed view of the decimator 66 for an exemplary embodiment in which the decimator 66 averages samples instead of discards samples after a reduction in the system's effective sampling rate by the decimator 66. In FIG. 4, the decimator 66 comprises a buffer 77 and a sample combiner 78. The buffer 77 may comprise registers (not specifically shown) or other memory devices for buffering the filtered samples from the digital filter 65. The sample combiner 78 may be implemented in hardware, software, or a combination thereof. As an example, the sample combiner 78 may be implemented in software and executed by a digital signal processor (DSP), a central processing unit (CPU), or other type of apparatus for executing the instructions of the sample combiner 78. In other embodiments, the sample combiner 78 can be implemented in firmware or hardware, such as logic gates, for example. Note that other configurations of the decimator 66 are possible, and it is unnecessary for such other configurations to include a sample combiner 78, such as is depicted in FIG. 4.

Once the buffer 77 has accumulated a set of consecutive samples to be averaged, the sample combiner 78 sums the samples within the set and divides the sum by the total number of samples of the set. The result is the average of the samples in the set, and this average is output by the signal combiner 78 to the summer 33 (FIG. 3). Moreover, an exemplary operation of the sample combiner 78 will be described in more detail below.

In the following description, assume for illustrative purposes that the output rate of the decimator 66 is to be controlled in accordance with the graph depicted by FIG. 5 for each mass scan. Initially, as shown by block 105 of FIG. 6, the controller 52 (FIG. 3) initializes a variable x to zero (0) and a constant a to the number of rate adjustments to be performed by the decimator 66 during the mass scan. In the instant example in which the decimator's output rate is to be adjusted four times for each mass scan, a is equal to four (4).

In block 108, the controller 52 begins a mass scan by causing the pulse source 17 to generate a pulse, which causes ions in the ion source 11 to be accelerated toward the ion detector 25. In block 111, the controller 52 provides control signals to the decimator 66 such that the output rate ($R_D$) of the decimator 66 is equal to the sampling rate ($R_{A/D}$) of the A/D converter 27 divided by $2^x$. Initially, x is zero (0), and $R_D$ is, therefore, equal to $R_{A/D}$. Thus, the controller 52 increments the address register 21 each clock cycle similar to the conventional controller 15 of FIG. 1. Further, the sample combiner 78 allows the samples from the digital filter 65 to pass through the decimator 66 unchanged. Accordingly, until the decimator's output rate is later adjusted, a sample is provided each clock cycle to the summer 33, which sums the sample with a running sum in memory 29, similar to the conventional spectrometer 10 depicted by FIG. 1. In addition, as shown by block 111 of FIG. 6, the controller 52 also provides control signals to the digital filter 65 such that the bandwidth ($BW_{filter}$) of the filter 65 is initially the same as the bandwidth ($BW_{analog}$) of the analog signal from the ion detector 25.

Figure 6:
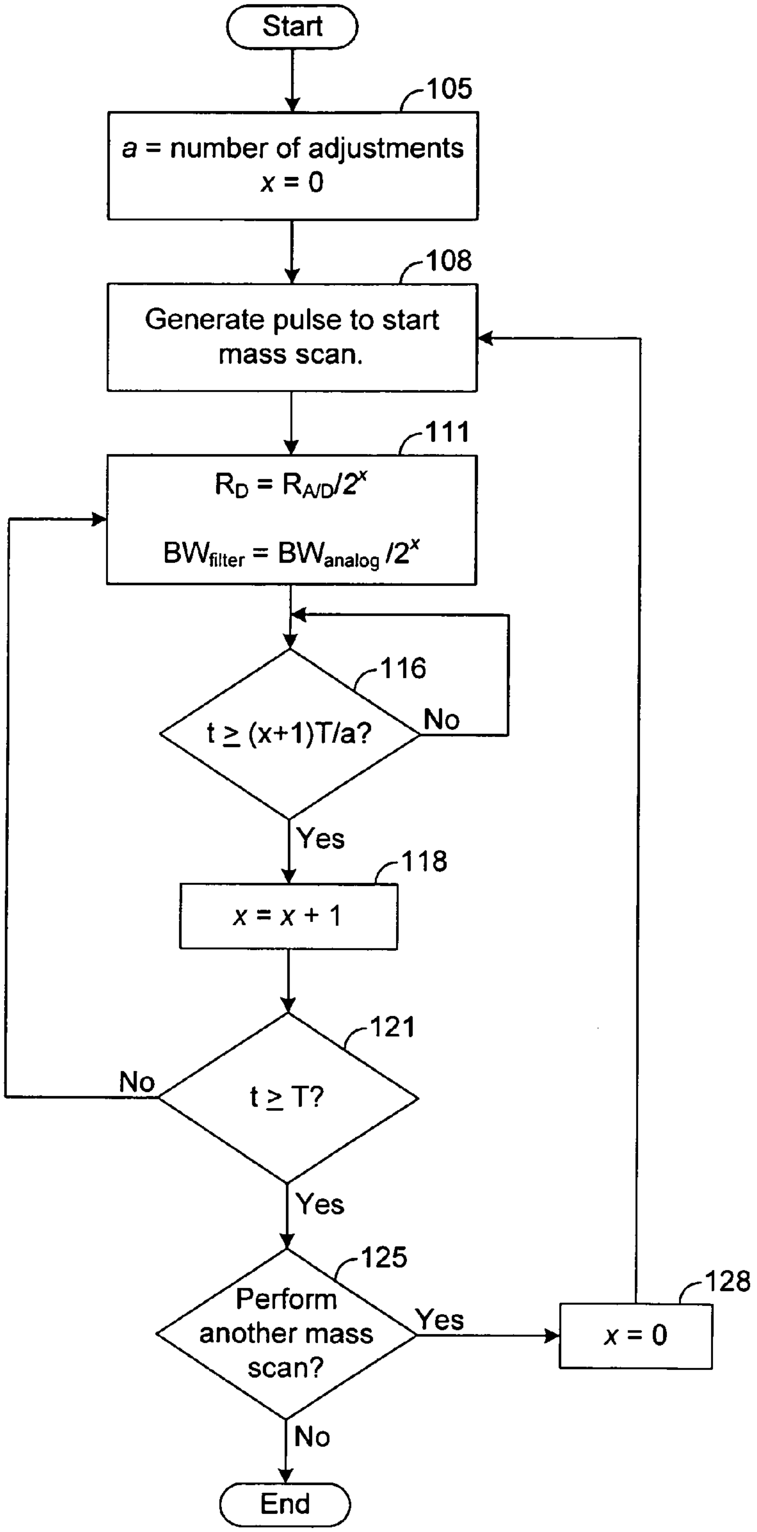
FIG. 6 is a flow chart illustrating an exemplary process for controlling the decimator and a digital filter depicted in FIG. 4.

In FIG. 6, the expression t represents the amount of time that has elapsed since the start of the current scan, and the expression T represents the total amount of time that elapses during the mass scan. Thus, t is preferably 0 at the start of the mass scan and equals T at the end of the mass scan. When t is greater than or equal to T/a, one-quarter of the mass scan has been completed. Noting that x is initially set to a value of zero (0), the controller 52 increments x to a value of one (1) once one-quarter of the mass scan is complete, as shown by blocks 116 and 118.

In block 121, the controller 121 compares t to T. Until the end of the mass scan, t will be less than T, and the controller 52, therefore, returns to block 111. Now that x equals one (1), the controller 52 provides control signals to reduce the decimator's output rate to one-half of its original output rate or, in other words, to reduce the decimator's output rate to one-half of $R_{A/D}$. The controller 52 also provides control signals to the digital filter 65 to reduce the filter's bandwidth to one-half the bandwidth of the analog signal from the ion detector 25.

When the output rate of the decimator 66 is reduced to one-half of $R_{A/D}$, the sample combiner 78 of the decimator 66 takes an average of every two consecutive samples received from the A/D converter 27 and outputs such average in lieu of the two consecutive samples. Note that, unless otherwise indicated herein, samples are "consecutive" if they are successively taken by the A/D converter 27. In addition, the controller 52 begins to increment the address register 21 every other clock cycle rather than every clock cycle. Further, a value is read out of the memory 29 and summed by summer 33 with the output of decimator 66 only when the address register 21 is incremented. The result of foregoing changes is illustrated by FIG. 7.

In this regard, assume that address (n−4) is storing the running sum for the last sample output by the decimator 66 just before the decimator's output rate is reduced from $R_{A/D}$ to one-half of $R_{A/D}$. In such an example, address (n−4) is storing $Sample_{n-3}$ as it does in the embodiment depicted by FIG. 1, as can be seen by comparing FIGS. 2 and 7. However, after outputting $sample_{n-3}$, the sample combiner 78 begins to average every two (2) consecutive samples from the A/D converter 27. Thus, address (n−3) stores the average of $sample_{n-2}$ and $sample_{n-1}$, and address (n−2) stores the average of $sample_n$ and $sample_{n+1}$, as shown by FIG. 7. Accordingly, as can be seen by comparing FIGS. 2 and 7, the amount of memory used to store the data for $sample_{n-3}$ to $sample_{n+1}$, is reduced as compared to an embodiment that does not adjust the effective sampling rate of the system 51. In this regard, FIG. 2 shows that five memory addresses are used in the conventional spectrometer 10 of FIG. 1 to store the data for $sample_{n-3}$ to $sample_{n+1}$, but only three addresses are used in the spectrometer 52 of the current example.

After one-half of the mass scan is complete, the controller 52 makes a "yes" determination in block 116 of FIG. 6 and, therefore, increments x to a value of two (2) in block 118. Now that x equals two (2), the controller 52 provides control signals to reduce the decimator's output rate to one-fourth of its original output rate or, in other words, to reduce the decimator's output rate to one-quarter of $R_{A/D}$. The controller 52 also provides control signals to the digital filter 65 to reduce the filter's bandwidth to one-quarter of the bandwidth of the analog signal from the ion detector 25.

When the output rate of the decimator 66 is reduced to one-quarter of $R_{A/D}$, the sample combiner 78 of the decimator 66 takes an average of every four consecutive samples received from the A/D converter 27 and outputs such average in lieu of the four consecutive samples. In addition, the controller 52 begins to increment the address register 21 every four clock cycles rather than every other clock cycle. Thus, an average for four samples from A/D converter 27 is summed every four clock cycles with a corresponding running sum in memory 29.

After three-quarters of the mass scan is complete, the controller 52 makes a "yes" determination in block 116 and, therefore, increments x to a value of three (3) in block 118. Now that x equals three (3), the controller 52 provides control signals to reduce the decimator's output rate to one-eighth of its original output rate or, in other words, to reduce the decimator's output rate to one-eighth of $R_{A/D}$. The controller 52 also provides control signals to the digital filter 65 to reduce the filter's bandwidth to one-eighth of the bandwidth of the analog signal from the ion detector 25.

When the output rate of the decimator 66 is reduced to one-eighth of $R_{A/D}$, the sample combiner 78 of the decimator 66 takes an average of every eight consecutive samples received from the A/D converter 27 and outputs such average in lieu of the eight consecutive samples. In addition, the controller 52 begins to increment the address register 21 every eight clock cycles rather than every four clock cycles. Thus, an average for eight samples from A/D converter 27 is summed every eight clock cycles with a corresponding running sum in memory 29.

From the foregoing description it can be seen that controller 52 increments address register 21 at a rate equal to the output rate of decimator 66.

At the end of the mass scan, the controller 52 makes a "yes" determination in block 116, as well as in block 121. Thus, in block 125, the controller 52 determines whether another mass scan is to be run. If the desired number of mass scans have yet to be performed to achieve the desired statistical accuracy for the resultant mass spectrum, the controller 52 resets x to a value of zero (0) in block 128 and repeats the aforedescribed process for the next mass scan. Once the desired number of mass scans have been performed, the process depicted by FIG. 6 ends, and the memory 29 is storing data points defining the resultant mass spectrum.

Since the effective sampling rate of the system 51 is reduced during the mass scan, the total number of data points in the memory 29 for the spectrometer 52 is less than the total number of data points in memory 29 for the conventional spectrometer 10 of FIG. 1. However, even though the effective sampling rate is ultimately reduced, the lighter mass ions in the spectrometer 52 can be effectively sampled at a relatively high rate as compared to the heavier mass ions, which arrive at the ion detector 25 later in the mass scan. Moreover, any adverse impact to the performance of the mass spectrometer 52 due to the reduction in the effective sampling rate can be minimized by strategically selecting the timing and the amount of the sampling rate adjustments such that lighter mass ions are effectively sampled at a higher rate as compared to heavier mass ions, as described herein.

It should be noted that it is unnecessary for the effective sampling rate to be reduced by a factor of two for each rate reduction or for the effective sampling rate to be periodically reduced at equal time intervals. Further, it is unnecessary for the bandwidth of the filter 65 to be reduced by the same percentage or at the same times as the effective sampling rate reductions provided that the Nyquist criterion remains satisfied.

We claim:

1. A mass spectrometer, comprising:

an ion detector; an analog-to-digital (A/D) converter configured to receive and sample an analog signal from the ion detector thereby providing a first plurality of samples at a first rate; and a decimator configured to receive the first plurality of samples and to transmit, at a second rate, a second plurality of samples that are based on the first plurality of samples, and to dynamically adjust the second rate, wherein the second rate is dynamically updated by the decimator in response to a determination that a portion of a mass scan has been completed by the mass spectrometer.

2. The mass spectrometer of claim 1, further comprising: memory having a plurality of memory addresses, each of the memory addresses storing a value representing a data point for a mass spectrum; and a summer configured to receive the second plurality of samples and to sum the second plurality of samples with values stored in the memory addresses.

3. The mass spectrometer of claim 2, further comprising an address register identifying which of the memory addresses is to currently provide a value for the summer, wherein the address register is incremented at a rate equal to the second rate.

4. The mass spectrometer of claim 1, wherein the decimator is configured to combine at least two of the first plurality of samples to form one of the second plurality of samples.

5. The mass spectrometer of claim 1, wherein each of the second plurality of samples represents an average of a respective plurality of the samples provided by the A/D converter.

6. The mass spectrometer of claim 1, wherein the decimator is configured to discard at least one of the first plurality of samples.

7. The mass spectrometer of claim 1, further comprising a digital filter configured to filter the samples provided by the A/D converter, wherein a bandwidth of the digital filter is dynamically updated based on the second rate.

8. A method for use in a mass spectrometer, the method comprising:

detecting ions;

sampling an analog signal indicative of the detected ions thereby providing a first plurality of samples at a first rate;

transmitting, at a second rate, a second plurality of samples of the analog signal to a summer, the second plurality of samples based on the first plurality of samples;

storing values defining a mass spectrum;

summing, via the summer, the second plurality of samples with the values;

dynamically adjusting the second rate; and determining a portion of a mass scat has been completed by the mass spectrometer, wherein the dynamically adjusting is in response to the determining.

9. The method of claim 8, further comprising combining at least two of the first plurality of samples, wherein at least one of the second plurality of samples is based on the combining.

10. The method of claim 8, wherein at least one of the second plurality of samples represents an average of at least two of the first plurality of samples.

11. The method of claim 8, further comprising discarding at least one of the first plurality of samples.

12. The method of claim 8, further comprising: transmitting the values from memory to the summer based on an address register; and incrementing the address register at a rate equal to the second rate.

13. The method of claim 8, further comprising: filtering, via a digital filter, the first plurality of samples; and dynamically adjusting a bandwidth of the digital filter based on the dynamically adjusting the second rate.

* * * * *

UNITED STATES PATENT AND TRADEMARK OFFICE

CERTIFICATE OF CORRECTION

PATENT NO. : 7,684,932 B2
APPLICATION NO. : 11/499459
DATED : March 23, 2010
INVENTOR(S) : August Hidalgo et al.

It is certified that error appears in the above-identified patent and that said Letters Patent is hereby corrected as shown below:

In Column 12, line 4, in claim 8, after "determining" insert -- that --.

In Column 12, line 4, in claim 8, delete "scat" and insert -- scan --, therefor.

Signed and Sealed this

Eighteenth Day of May, 2010

David J. Kappos

*Director of the United States Patent and Trademark Office*